United States Patent
Endo et al.

(10) Patent No.: US 12,312,024 B2
(45) Date of Patent: May 27, 2025

(54) CONTROL DEVICE, DRIVE DEVICE, ELECTRIC POWER STEERING DEVICE, AND CONTROL METHOD

(71) Applicant: Nidec Corporation, Kyoto (JP)

(72) Inventors: Shuji Endo, Kyoto (JP); Hiroyuki Ishimura, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 364 days.

(21) Appl. No.: 17/632,380

(22) PCT Filed: Aug. 6, 2020

(86) PCT No.: PCT/JP2020/030252
§ 371 (c)(1),
(2) Date: Feb. 2, 2022

(87) PCT Pub. No.: WO2021/029329
PCT Pub. Date: Feb. 18, 2021

(65) Prior Publication Data
US 2022/0289275 A1 Sep. 15, 2022

(30) Foreign Application Priority Data
Aug. 9, 2019 (JP) .................. 2019-147465

(51) Int. Cl.
*B62D 5/04* (2006.01)
*B62D 6/02* (2006.01)

(52) U.S. Cl.
CPC ............. *B62D 5/0463* (2013.01); *B62D 6/02* (2013.01)

(58) Field of Classification Search
CPC .......... B62D 5/0463; B62D 6/02; B62D 6/06; B62D 6/008; B62D 5/0472; B62D 5/046
See application file for complete search history.

(56) References Cited

U.S. PATENT DOCUMENTS

| | | | |
|---|---|---|---|
| 6,134,490 A * | 10/2000 | Ito | B62D 5/0463 180/443 |
| 2002/0043423 A1* | 4/2002 | Endo | B62D 5/0463 180/446 |
| 2003/0120404 A1* | 6/2003 | Endo | B62D 5/0463 701/41 |

(Continued)

FOREIGN PATENT DOCUMENTS

| | | |
|---|---|---|
| CN | 104661897 A | 5/2015 |
| DE | 103 44 279 B4 | 4/2006 |

(Continued)

OTHER PUBLICATIONS

Official Communication issued in corresponding Chinese Patent Application No. 202080056039.9, mailed on May 11, 2023.

(Continued)

*Primary Examiner* — Thomas E Worden
*Assistant Examiner* — Christopher Scott
(74) *Attorney, Agent, or Firm* — Keating & Bennett, LLP

(57) ABSTRACT

A control device obtains an assist torque of an electric power steering device based on a steering torque, compensates for the assist torque, varies an amount of change in a compensation amount based on the steering torque, and increases the compensation amount to cancel a disturbance of the assist torque as a frequency of a disturbance affecting the steering system increases.

12 Claims, 6 Drawing Sheets

(56) References Cited

U.S. PATENT DOCUMENTS

| | | | |
|---|---|---|---|
| 2007/0168094 A1* | 7/2007 | Nishiyama | B62D 5/0472 |
| | | | 701/41 |
| 2013/0124048 A1 | 5/2013 | Gruener et al. | |
| 2015/0151783 A1* | 6/2015 | Kitazume | B62D 5/0481 |
| | | | 701/42 |
| 2016/0280252 A1* | 9/2016 | Tagami | B62D 5/0421 |
| 2017/0057544 A1 | 3/2017 | Matsuno et al. | |
| 2018/0022384 A1* | 1/2018 | Kataoka | B62D 5/0472 |
| | | | 180/446 |
| 2019/0359248 A1* | 11/2019 | Tsubaki | B62D 5/0463 |
| 2020/0031385 A1* | 1/2020 | Kezobo | B62D 6/00 |
| 2020/0290671 A1 | 9/2020 | Farshizadeh et al. | |

FOREIGN PATENT DOCUMENTS

| | | |
|---|---|---|
| DE | 60 2005 000 165 T2 | 8/2007 |
| DE | 199 19 374 B4 | 9/2007 |
| DE | 10 2008 048 419 A1 | 4/2010 |
| DE | 10 2009 047 586 A1 | 6/2011 |
| DE | 10 2010 031 211 A1 | 1/2012 |
| DE | 10 2014 204 097 A1 | 9/2014 |
| DE | 10 2017 121 952 A1 | 3/2019 |

OTHER PUBLICATIONS

Official Communication issued in International Patent Application No. PCT/JP2020/030252, mailed on Sep. 15, 2020.

* cited by examiner

CONTROL DEVICE, DRIVE DEVICE, ELECTRIC POWER STEERING DEVICE, AND CONTROL METHOD

CROSS-REFERENCE TO RELATED APPLICATIONS

This is a U.S. national stage of application No. PCT/JP2020/030252, filed on Aug. 6, 2020, with priority under 35 U.S.C. § 119(a) and 35 U.S.C. § 365(b) being claimed from Japanese Patent Application No. 2019-147465, filed on Aug. 9, 2019, the entire disclosures of which are hereby incorporated herein by reference.

FIELD OF THE INVENTION

The present disclosure relates to a control device that controls driving of an electric power steering device, a drive device controlled by the control device, an electric power steering device including the drive device, and a control method.

BACKGROUND

In recent years, in a control device of an electric power steering device (EPS), vibration of a handle (alternatively, the steering wheel) is reduced by reducing an influence of disturbance that hinders steering driving, and comfortable driving for a driver is realized. EPS stands for Electric Power Steering. As the disturbance that hinders such steering driving, irregular road traveling, shimmy vibration, kickback vibration, and the like are known.

Here, the kickback vibration is a phenomenon in which the vehicle body vibration and the shock due to the unevenness of the road surface cause resonance, and the steering wheel and the tire cause vibration. The kickback vibration may change the traveling direction of the vehicle in an unintended direction due to the steering wheel being taken, thereby making it difficult to travel. In addition, the shimmy vibration is a phenomenon in which vibration generated by the imbalance of the tire is transmitted to the steering wheel, and the steering wheel vibrates. The shimmy vibration may become large vibration around 100 km/h at which the resonance frequency of the suspension and the rotation frequency of the tire coincide with each other, and may hinder comfortable steering.

When the vehicle travels, it is necessary to notify the driver that the tire and the road surface are normally in ground contact with each other. However, at the time of traveling on the uneven portion of the road surface, the ground contact is excessively transmitted, which is an uncomfortable driving feeling for the driver. Further, during traveling on the uneven portion of the road surface, the above-described shimmy vibration and kickback vibration are likely to occur due to the vehicle body vibration and the shock caused by the unevenness of the road surface, and in an extreme case, continuation of traveling may be difficult. Conventionally, in order to prevent such a situation, there has been a demand for a technique capable of reducing vibration during traveling on an uneven portion of a road surface and enabling comfortable driving for a driver.

In such a situation, conventionally, in the disturbance sensitivity design using a disturbance observer, a disturbance force transmitted to the steering system is estimated using a mathematical model based on the torque necessary for the power assist and the behavior of the steering system. Then, conventionally, the disturbance is canceled and reduced by adding the estimated disturbance force to the power assist torque.

However, in the disturbance sensitivity design using the conventional mathematical model, the steering feeling may tend to be an artificial feeling and may include a modeling error. Therefore, the influence of the modeling error may also be involved in the unnaturalness of the steering feeling.

SUMMARY

An example embodiment of a control device according to the present disclosure is a control device that controls an electric power steering device. The control device includes an assist controller configured or programmed to obtain an assist torque of the electric power steering device based on a steering torque, and a torque compensator to compensate for the assist torque and to make an amount of change in a compensation amount variable based on the steering torque, and increase the compensation amount to cancel a disturbance with respect to the assist torque as a frequency of the disturbance affecting the steering system is higher.

An example embodiment of a drive device according to the present disclosure includes the control device and an electric motor driven by the control device.

An example embodiment of an electric power steering device according to the present disclosure includes the control device, an electric motor driven by the control device, and an electric power steering mechanism driven by the electric motor.

An example embodiment of a control method according to the present disclosure includes obtaining an assist torque of the electric power steering device based on a steering torque, compensating for the assist torque, varying an amount of change in a compensation amount of the assist torque based on the steering torque, and increasing the compensation amount to cancel a disturbance with respect to the assist torque as a frequency of the disturbance affecting a steering system is higher.

The above and other elements, features, steps, characteristics and advantages of the present disclosure will become more apparent from the following detailed description of the example embodiments with reference to the attached drawings.

DETAILED DESCRIPTION OF THE EXAMPLE EMBODIMENTS

Hereinafter, control devices according to example embodiments of the present disclosure will be described with reference to the drawings. Note that the scope of the present disclosure is not limited to the example embodiments described below, but includes any modification thereof within the scope of the technical idea of the present disclosure. Further, in the following drawings, to easily understand each component, a scale, the number, etc., of each structure may be different from those of actual structures.

Figure 1:
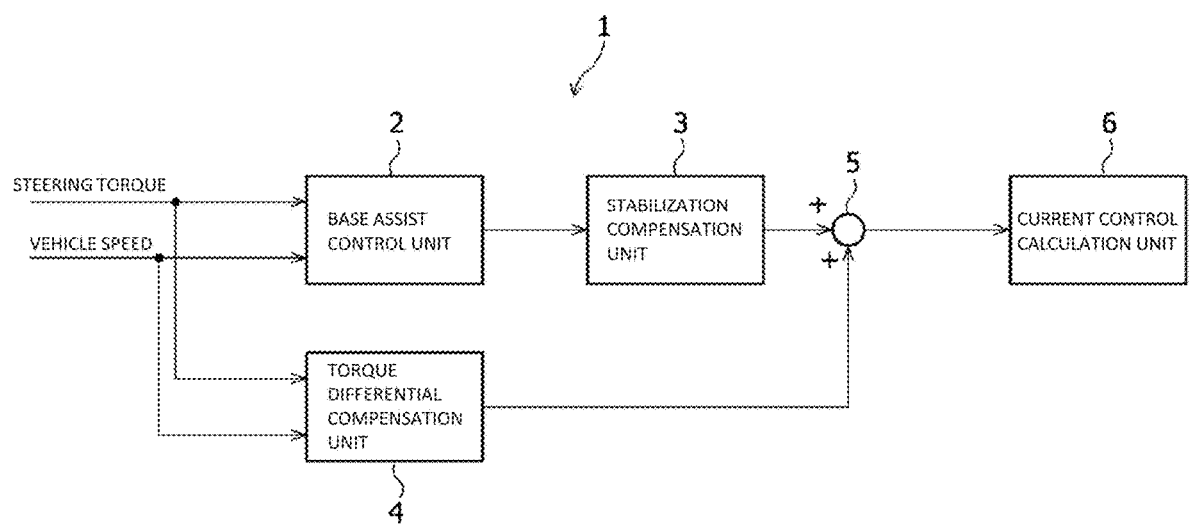
FIG. 1 is a block diagram illustrating a configuration of a control device according to an example embodiment of the present disclosure.

A configuration of a control device 1 according to an example embodiment of the present disclosure will be described in detail below with reference to FIG. 1.

The control device 1 controls driving of an electric power steering device described later. The control device 1 includes a base assist controller 2, a stabilization compensator 3, a torque differential compensator 4, an adder 5, and a current control calculation unit 6. The control device 1 has a configuration in which the base assist controller 2 and the torque differential compensator 4 are connected in parallel.

The base assist controller 2 obtains a base assist torque based on the input steering torque signal and vehicle speed signal. More specifically, the base assist controller 2 obtains the base assist torque according to the steering torque, and decreases the base assist torque as the vehicle speed increases. The base assist controller 2 previously stores, for example, a table in which the vehicle speed, the steering torque, and the base assist torque are associated with each other, and refers to this table to obtain the base assist torque associated with the vehicle speed indicated by the input vehicle speed signal and input steering torque. The base assist controller 31 outputs the base assist torque signal corresponding to the base assist torque thus obtained to the stabilization compensator 3. Since the base assist torque is a torque generated to assist the steering operation in the electric power steering device, it may be simply referred to as an assist torque.

The stabilization compensator 3 performs phase compensation by combining a plurality of phase lead compensation and phase delay compensation with respect to the base assist torque signal input from the base assist controller 2. The stabilization compensator 3 dynamically changes the frequency characteristic of the phase compensation according to the steering state and the traveling vehicle speed. The stabilization compensator 3 executes the stabilization process to obtain the assist torque of the electric power steering device, and outputs the assist torque signal corresponding to the obtained assist torque to the adder 5.

The torque differential compensator 4 executes torque differential compensation processing (to be described later) for obtaining a torque differential compensation torque that compensates for the base assist torque based on the input steering torque signal and vehicle speed signal and a disturbance affecting the steering system. The torque differential compensator 4 outputs a compensation signal corresponding to the obtained torque differential compensation torque to the adder 5. The steering system includes an electric motor, an ECU, a steering wheel, and the like. ECU stands for Electronic Controller. In particular, the torque differential compensator 4 of the present example embodiment compensates for the dynamic influence of the electric motor inertia in a state where the steering operation assist by the electric power steering device does not work (for example, when the vehicle travels straight). Details of the configuration of the torque differential compensator 4 will be described later with reference to FIG. 2.

The adder 5 adds the assist torque of the assist torque signal input from the stabilization compensator 3 and a torque differential compensation torque of the compensation signal input from the torque differential compensator 4 to obtain a target assist torque. The adder 5 outputs a target assist torque signal corresponding to the obtained target assist torque to the current control calculation unit 6.

The current control calculation unit 6 calculates a drive current of the electric motor based on the target assist torque signal input from the adder 5. The drive current calculated by the current control calculation unit 6 is output to an electric motor (not illustrated), and the electric power steering device is driven by the electric motor.

Figure 2:
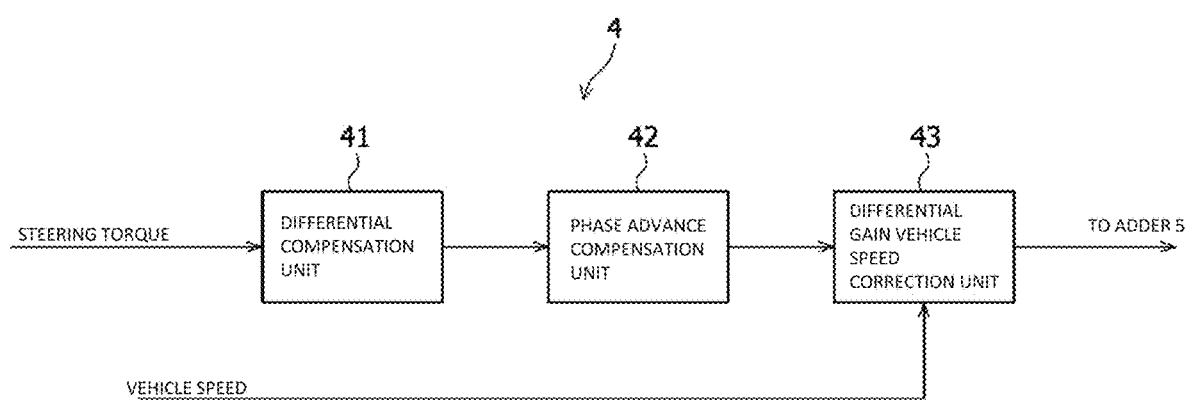
FIG. 2 is a block diagram illustrating a configuration of a torque differential compensator of the control device according to an example embodiment of the present disclosure.

The configuration of the torque differential compensator of the control device 1 according to the present example embodiment of the disclosure will be described in detail below with reference to FIG. 2.

The torque differential compensator 4 includes a differential compensator 41, a phase advance compensator 42, and a differential gain vehicle speed correction unit 43.

The differential compensator 41 calculates an operation amount (electric motor torque) by pseudo-differentiating the input steering torque, and multiplies the calculated operation amount by a differential gain to generate a differential compensation signal in which the gain increases as the frequency increases. The differential compensator 41 outputs the generated differential compensation signal to the phase advance compensator 42.

The phase advance compensator 42 executes, on the differential compensation signal input from the differential compensator 41, stabilization compensation processing of advancing the phase of a desired frequency band in which the disturbance sensitivity is desired to be lowered, thereby generating a phase advance compensation signal in which the gain in the desired frequency band is further increased. The phase advance compensator 42 outputs the generated phase advance compensation signal to the differential gain vehicle speed correction unit 43. The phase advance compensation signal output from the phase advance compensator 42 increases the compensation amount for canceling the disturbance with respect to the base assist torque as the frequency of the disturbance is higher.

The differential gain vehicle speed correction unit 43 corrects the phase advance compensation signal by executing vehicle speed correction processing corresponding to the vehicle speed of the input vehicle speed signal with respect to the phase advance compensation signal input from phase advance compensator 42, and generates a compensation signal. The differential gain vehicle speed correction unit 43 outputs the generated compensation signal to the adder 5. The compensation signal output from the differential gain vehicle speed correction unit 43 compensates for the base assist torque by a compensation amount obtained by correcting the compensation amount of the phase advance compensation signal output from the phase advance compensator 42 on the basis of the vehicle speed.

Figure 3:
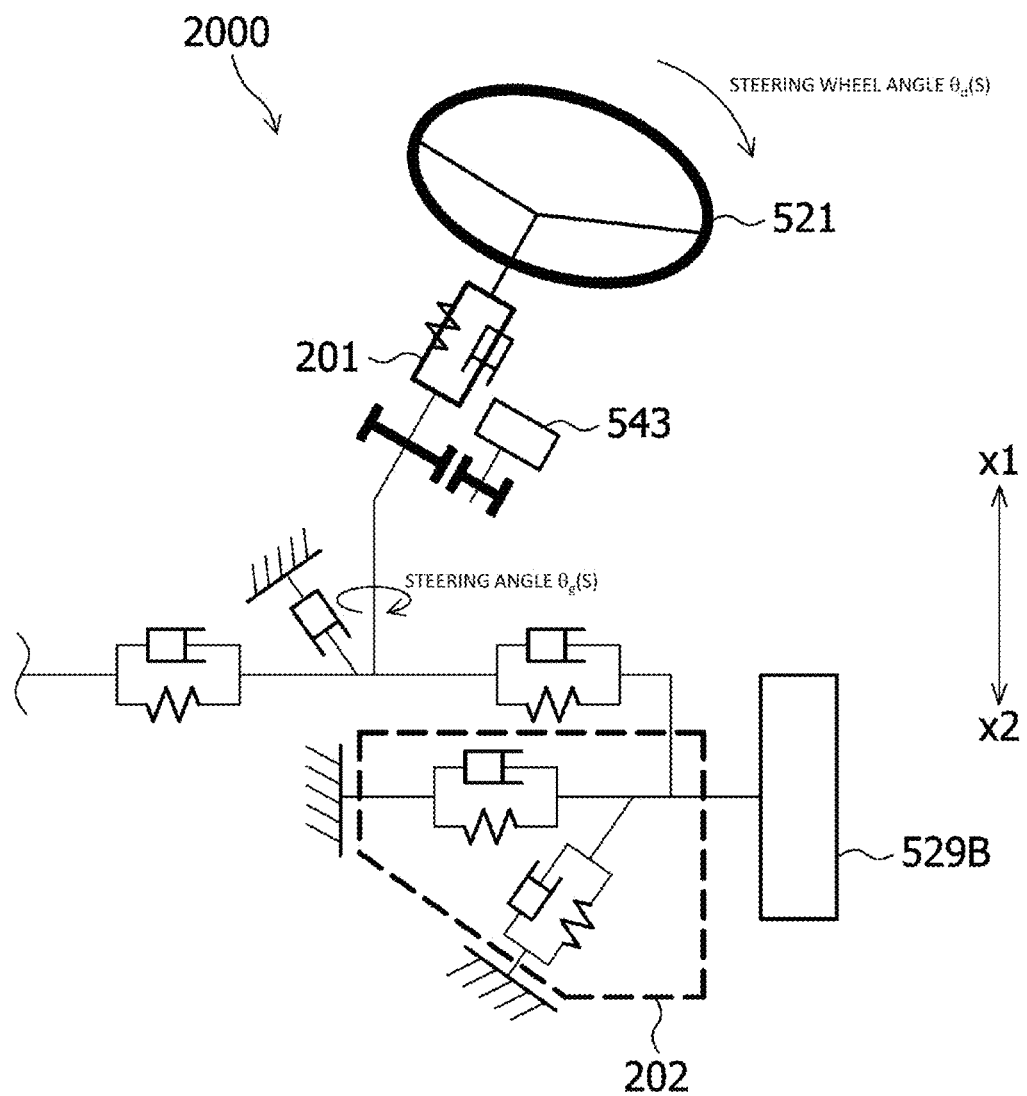
FIG. 3 is a diagram schematically illustrating a configuration of a suspension of an electric power steering device according to an example embodiment of the present disclosure.

The configuration of a power assist control mechanism 100 including the control device 1 according to an example embodiment of the present disclosure will be described in detail below with reference to FIGS. 3 and 4.

Figure 4:
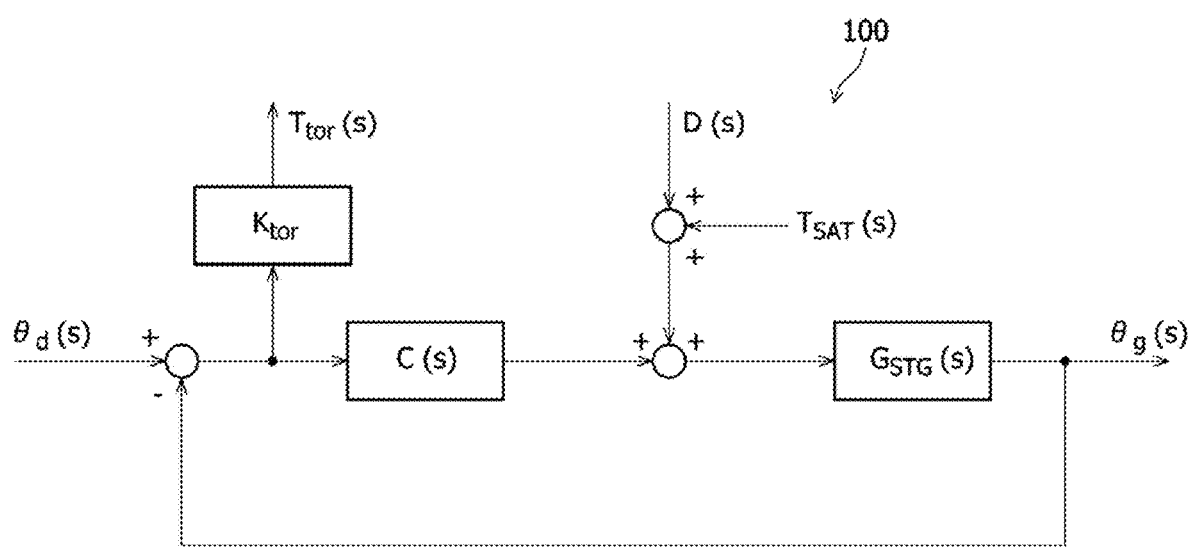
FIG. 4 is a block diagram illustrating a configuration of a power assist control mechanism including a control device according to an example embodiment of the present disclosure.

In FIG. 4, $\theta_d$ is a steering wheel angle, $\theta_g$ is a steering angle, $D(s)$ is a disturbance, $T_{tor}(s)$ is a torsion bar torque, $K_{tor}$ is a torsion bar, $G_{STG}(s)$ is a steering system, $C(s)$ is a controller, and $T_{SAT}(s)$ is a self-aligning torque.

The power assist control mechanism 100 of the electric power steering device is considered as a simple feedback control system as illustrated in FIG. 4 when the steering wheel angle $\theta_d$ is input and the steering angle $\theta_g$ is output. In the feedback control system illustrated in FIG. 4, the controller C(s) has a configuration in which the base assist controller 2 and the torque differential compensator 4 are connected in parallel in the configuration of the control device 1 in FIG. 1, but does not include the stabilization compensator 3 and does not include the current control calculation unit 6 in order to achieve a stabilized disturbance suppression sensitivity design.

Torque differential compensation processing according to an example embodiment of the present disclosure will be described in detail below with reference to FIGS. 3 to 5.

In the power assist control mechanism 100 illustrated in FIG. 4, the transmission characteristic up to the torsion bar torque $T_{tor}$ (S) of the disturbance D(s) is expressed by Expression (1).

[Math. 1]

$$\frac{T_{tor}(s)}{D(s)} = \frac{G_{STG}(s)}{1 + C(s)G_{STG}(s)}K_{tor} = (1 - T(s))G_{STG}(s)K_{tor} \quad (1)$$

Here, in Expression (1), $G_{STG}(s)$ represents a steering system including the steering wheel 521, C(s) represents a controller, T(s) represents a complementary sensitivity function, and $K_{tor}$ represents a torsion bar 201.

The complementary sensitivity function T(s) of Expression (1) is expressed by Expression (2).

[Math. 2]

$$T(s) = \frac{C(s)G_{STG}(s)}{1 + C(s)G_{STG}(s)} \quad (2)$$

It can be seen from Expression (1) that the complementary sensitivity function T(s) needs to be set to 1 in order to lower (set to 0) the disturbance sensitivity. In addition, in order to set the complementary sensitivity function T(s) to 1, it is necessary to increase the gain of the controller C(s) from Expression (2).

In addition, the influence of the disturbance is the largest at the time of straight travel in which the vehicle is controlled only by minute steering. At the time of minute steering, since the base assist torque obtained by the base assist controller 2 due to the dead zone of the base assist curve is substantially zero, the gain of the controller C(s) decreases, and the disturbance sensitivity increases. However, in the present example embodiment, at the time of traveling straight, the torque differential compensator 4 performs compensation on the base assist torque according to the amount of change in the steering torque.

Specifically, the torque differential compensator 4 performs differential compensation to increase the gain of the controller C(s) as the frequency becomes higher in the differential compensator 41. In addition, the torque differential compensator 4 further increases the gain of the controller C(s) by performing phase advance compensation in the phase advance compensator 42 for the frequency at which the disturbance sensitivity is desired to be lowered. As a result, the gain of the compensation signal output from the torque differential compensator 4 having the frequency characteristics illustrated in FIG. 5 increases as the frequency increases, and the gain further increases in the frequency band between a frequency f1 and a frequency f2, so that the amount of change in the compensation amount with respect to the base assist torque increases. At this time, in the frequency band between the frequency f1 and the frequency f2 in which the gain is further increased, the complementary sensitivity function T(s) approaches 1 by the phase advance compensation, so that the disturbance sensitivity can be reduced.

As described above, the torque differential compensator can adjust the frequency band in which the disturbance sensitivity is desired to be lowered by adjusting the frequency at which the phase advance compensation is performed to make the amount of change in the compensation amount with respect to the base torque variable. Preferably, the torque differential compensator 4 performs the phase advance compensation in the frequency band corresponding to the natural frequency band in the front-rear direction (x1 direction and x2 direction in FIG. 3) of a suspension 202. That is, the torque differential compensator 4 makes the amount of change in the compensation amount in the frequency band corresponding to the natural frequency band in the front-rear direction of the suspension larger than the amount of change in the compensation amount in the band other than the frequency band. The frequency band corresponding to the natural frequency band is, for example, 15 Hz to 18 Hz. As a result, the disturbance sensitivity can be lowered in the frequency band corresponding to the natural frequency band in the front-rear direction of the suspension 202, and comfortable driving can be provided for the driver.

Figure 5:
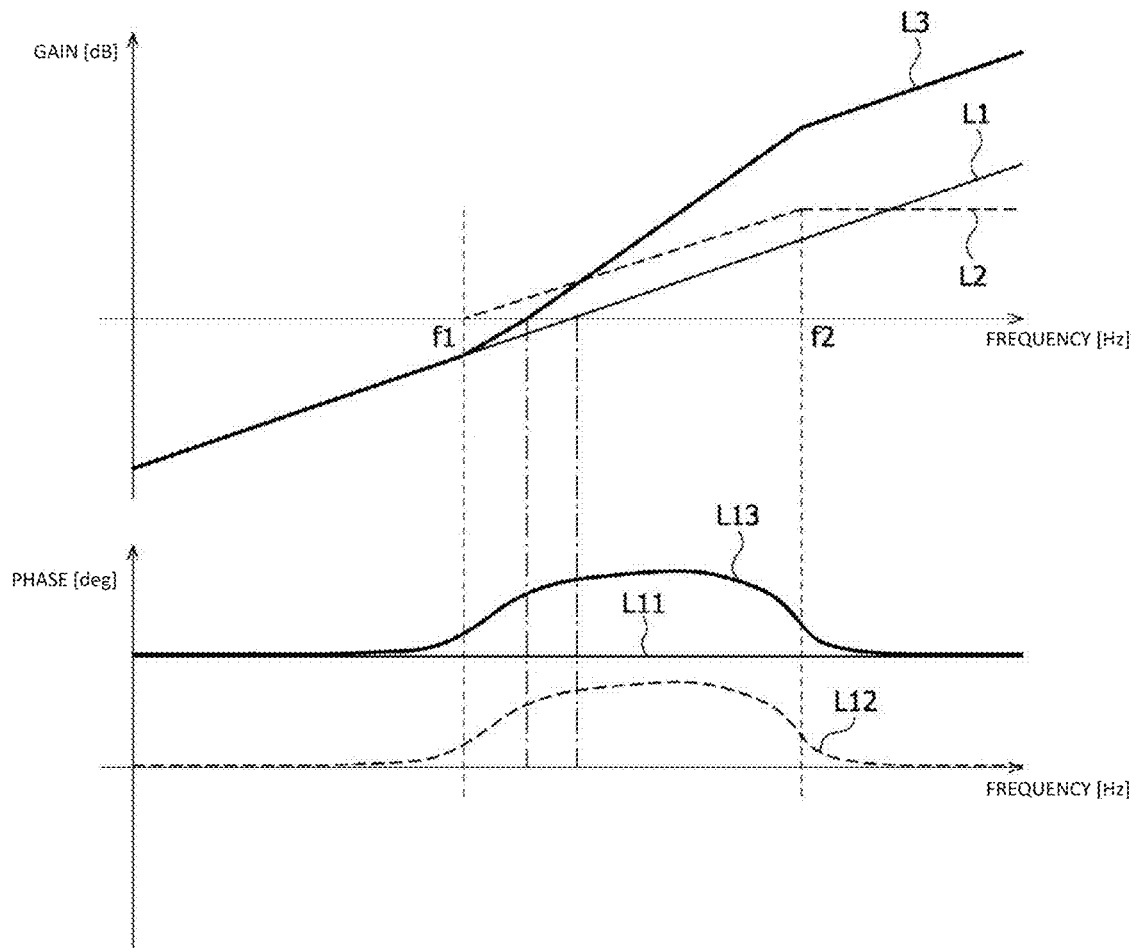
FIG. 5 is a diagram explaining processing in a torque portion compensator of the control device of an example embodiment of the present disclosure.

As illustrated in FIG. 5, according to the torque differential compensation processing, the frequency characteristics of compensation signals L3 and L13 output from the torque differential compensator 4 can advance the phases and gain of the frequency characteristics between frequency f1 and frequency f2 more than those of signals L1 and L11 subjected only to differential compensation in the differential compensator 41, and can advance the phases and gain of the frequency characteristics more than those of signals L2 and L12 subjected only to phase advance compensation in the phase advance compensator 42.

Incidentally, the information of the road surface condition or the traction of the tire is disturbance force information to be actively transmitted, and is mainly included in 10 Hz to 15 Hz. Therefore, in the disturbance sensitivity design, it is required to design so that the disturbance sensitivity becomes high at 10 Hz or less, and on the other hand, it is required to design so that the disturbance sensitivity becomes low as the frequency increases since the driver feels a sensitive steering feeling at 15 Hz or more.

Vehicles such as automobiles are generally equipped with a power steering device. A power steering device generates an auxiliary torque for assisting the steering torque of the steering system generated by the driver operating the steering wheel. The auxiliary torque is generated by an auxiliary torque mechanism, and can reduce the burden on the driver's operation. For example, the auxiliary torque mechanism includes a steering torque sensor, an ECU, an electric motor, a deceleration mechanism, and the like. The steering torque sensor detects the steering torque in the steering system. The ECU generates a drive signal based on the detection signal of the steering torque sensor. The electric motor generates an auxiliary torque according to the steering torque based on the drive signal, and transmits the auxiliary torque to the steering system via the reduction mechanism.

Figure 6:
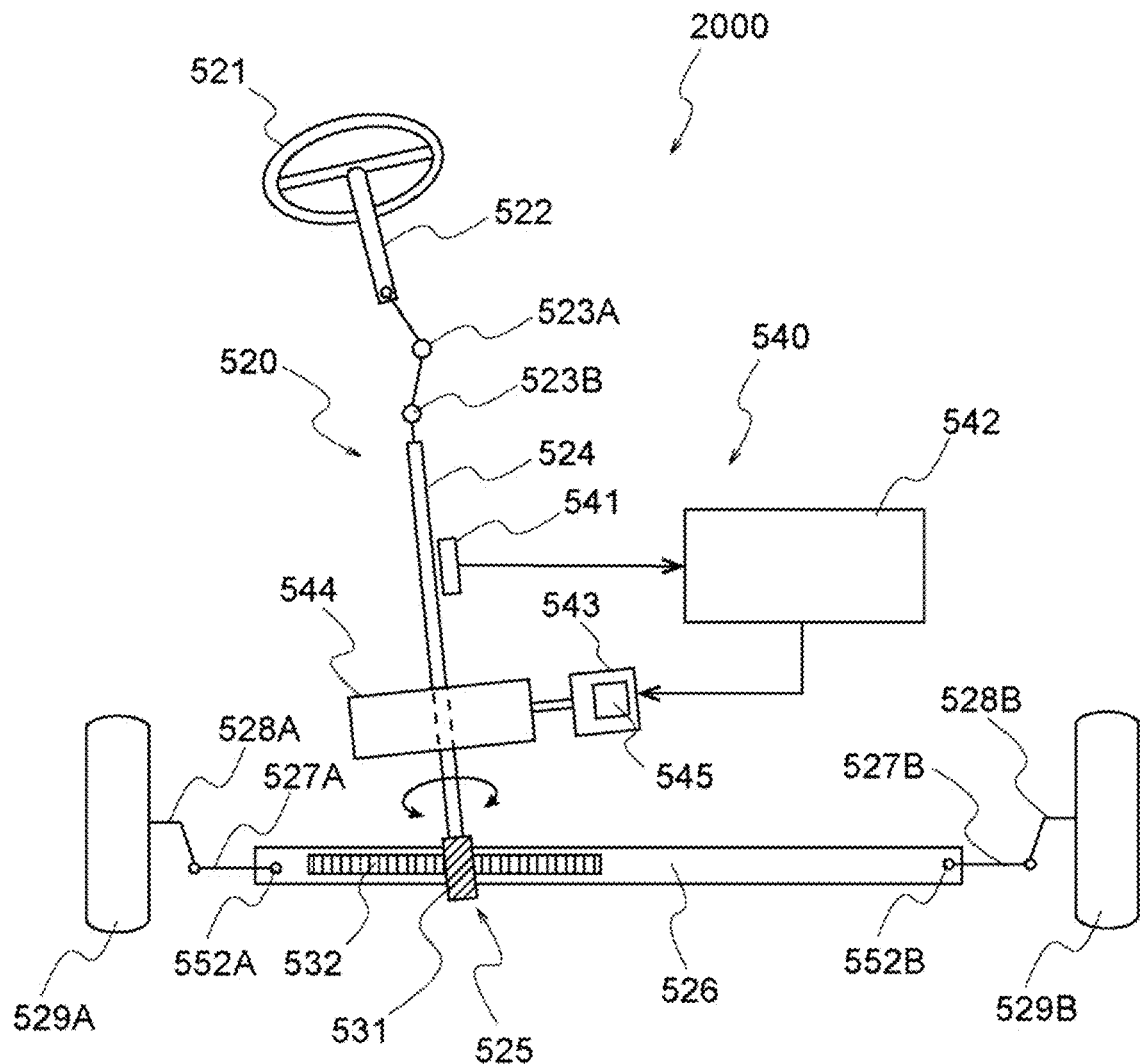
FIG. 6 is a diagram schematically illustrating a configuration of an electric power steering device according to an example embodiment of the present disclosure.

The control device 1 of the above example embodiment is suitably used for a power steering device. FIG. 6 is a diagram schematically illustrating the configuration of an electric power steering device 2000 according to the present example embodiment.

The electric power steering device 2000 includes a steering system 520 and an auxiliary torque mechanism (power steering mechanism) 540. The electric power steering device 2000 has the suspension 202.

The steering system 520 includes, for example, a steering wheel 521, a steering shaft 522 (also referred to as a "steering column"), free shaft joints 523A and 523B, and a rotation shaft 524 (also referred to as a "pinion shaft" or "input shaft").

The steering system 520 also includes, for example, a rack-and-pinion mechanism 525, a rack shaft 526, left and right ball joints 552A and 552B, tie rods 527A and 527B, knuckles 528A and 528B, and left and right steering wheels (for example, left and right front wheels) 529A and 529B.

The steering wheel 521 is connected to the rotation shaft 524 via the steering shaft 522 and the free shaft joints 523A and 523B. The rack shaft 526 is connected to the rotation shaft 524 via the rack-and-pinion mechanism 525. The rack-and-pinion mechanism 525 has a pinion 531 provided to the rotation shaft 524 and a rack 532 provided to the rack shaft 526. The right steering wheel 529A is connected to the right end of the rack shaft 526 via the ball joint 552A, the tie rod 527A and the knuckle 528A in this order. Similar to the right side, the left steering wheel 529B is connected to the left end of the rack shaft 526 via the ball joint 552B, the tie rod 527B and the knuckle 528B in this order. Here, the right side and the left side correspond to the right side and the left side as seen from the driver sitting on the seat, respectively.

According to the steering system 520, steering torque is generated when the driver operates the steering wheel 521, and is transmitted to the left and right steering wheels 529A and 529B via the rack-and-pinion mechanism 525. As a result, the driver can operate the left and right steering wheels 529A and 529B.

The auxiliary torque mechanism 540 includes, for example, a steering torque sensor 541, an ECU 542, an electric motor 543, a deceleration mechanism 544, and a power supply device 545. The auxiliary torque mechanism 540 applies auxiliary torque to the steering system 520 from the steering wheel 521 to the left and right steering wheels 529A and 529B. The auxiliary torque is sometimes referred to as "additional torque".

As the ECU 542, for example, a control circuit is used. The control device 1 of FIG. 1 is included in the ECU 542 as, for example, a microcontroller. As the power supply device 545, for example, an inverter is used. The ECU 542, the electric motor 543, and the electric power supply device 545 may constitute a unit generally referred to as a "mechanical and electrical integrated motor".

Of the elements illustrated in FIG. 8, the mechanism configured of the elements excluding the ECU 542, the electric motor 543, and the power supply device 545 corresponds to an example of the power steering mechanism driven by the electric motor 543.

The steering torque sensor 541 detects the steering torque of the steering system 520 applied by the steering wheel 521. The ECU 542 generates a drive signal for driving the electric motor 543 based on a detection signal from the steering torque sensor 541 (hereinafter, referred to as a "torque signal"). The electric motor 543 generates an auxiliary torque according to the steering torque based on the drive signal. The auxiliary torque is transmitted to the rotation shaft 524 of the steering system 520 via the deceleration mechanism 544. The deceleration mechanism 544 is, for example, a worm gear mechanism. Auxiliary torque is further transmitted from the rotation shaft 524 to the rack-and-pinion mechanism 525.

The power steering device 2000 is classified into a pinion assist type, a rack assist type, a column assist type, or the like, depending on the part where the auxiliary torque is applied to the steering system 520. FIG. 6 illustrates the power steering device 2000 of the pinion-assist type. However, the power steering device 2000 is also applied to the rack assist type, the column assist type, and the like.

Not only a torque signal but also a vehicle speed signal, for example, can be input to the ECU 542. The microcontroller of the ECU 542 can PWM control the electric motor 543 based on the torque signal, the vehicle speed signal, and the like.

The ECU 542 sets a target current value at least based on the torque signal. It is preferable that the ECU 542 sets the target current value in consideration of the vehicle speed signal detected by the vehicle speed sensor and further in consideration of the rotation signal of the rotor detected by the angle sensor. The ECU 542 can control the drive signal, that is, the drive current of the electric motor 543 so that the actual current value detected by the current sensor matches the target current value.

According to the power steering device 2000, the right and left steering wheels 529A and 529B can be operated by the rack shaft 526 by utilizing the combined torque obtained by adding the auxiliary torque of the electric motor 543 to the steering torque of the driver.

In the above, a power steering device is mentioned as an example of the usage in the control device of the present disclosure, but the usage of the control device of the present disclosure is not limited to those described above. It is applicable to a wide range including a pump, a compressor or the like.

As described above, according to the present example embodiment, in the frequency band corresponding to the frequency of the disturbance, the compensation amount of the assist torque is increased and the amount of change in the compensation amount is made variable as the frequency increases based on the steering torque and the vehicle speed, whereby unnaturalness of the steering feeling can be suppressed and the influence of the disturbance on the steering feeling can be reduced. In particular, it is possible to compensate for the dynamic influence of the electric motor inertia in a state where the steering operation assist by the electric power steering device does not work.

It is to be considered that the example embodiments described above are illustrative in all aspects, and are not restrictive. The scope of the present disclosure is shown not by the above-described example embodiment but by the scope of the claims, and is intended to include all changes within the meaning and scope equivalent to the scope of claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A control device that controls an electric power steering device, the control device comprising:
   an assist controller configured or programmed to obtain an assist torque of the electric power steering device based on a steering torque; and
   a torque compensator configured or programmed to compensate for the assist torque; wherein
   the torque compensator is configured or programmed to make an amount of change in a compensation amount variable based on the steering torque, and increase a compensation amount to cancel a disturbance with respect to the assist torque as a frequency of the disturbance affecting the steering system increases;
   the torque compensator is configured or programmed to increase gain as the frequency becomes higher, and to further increase the gain for a specific desired frequency; and
   the torque compensator includes:
      a differential compensator which calculates an operation amount from the steering torque and outputs a differential compensation signal; and
      a phase advance compensator which performs phase advance compensation on the differential compensation signal output from the differential compensator to further increase the gain at the specific desired frequency and outputs a phase advance compensation signal.

2. The control device according to claim 1, wherein the assist controller reduces the assist torque as a vehicle speed increases.

3. The control device according to claim 1, wherein the torque compensator is configured or programmed to correct the compensation amount based on the vehicle speed.

4. The control device according to claim 1, wherein the torque compensator is configured or programmed to increase an amount of change in a frequency band corresponding to a natural frequency band in a front-rear direction of a suspension to be larger than an amount of change in a band other than the frequency band.

5. The control device according to claim 1, wherein the phase advance compensator advances a phase of a compensation signal to compensate for the assist torque.

6. The control device according to claim 1, wherein the torque compensator is configured or programmed to increase the amount of change by performing processing of bringing a complementary sensitivity function T(s) indicating a transmission characteristic up to a torsion bar torque of the disturbance to "1" or substantially "1", the sensitivity function T(s) corresponding to the following equation:

$$T(s) = \frac{C(s)G_{STG}(s)}{1 + C(s)G_{STG}(s)} \quad (1)$$

T(s): complementary sensitivity function
C(s): controller
GSTG(s): steering system.

7. The control device according to claim 1, wherein the torque compensator is configured or programmed to compensate for the assist torque only when a vehicle travels straight.

8. A drive device comprising:
   a control device according to claim 1; and
   an electric motor that is driven by the control device.

9. An electric power steering device comprising:
   the control device according to claim 1;
   an electric motor driven by the control device; and
   an electric power steering mechanism driven by the electric motor.

10. A control method to control an electric power steering device, the control method comprising:
    obtaining an assist torque of the electric power steering device based on a steering torque;
    compensating for the assist torque; and
    varying an amount of change in a compensation amount of the assist torque based on the steering torque, and increasing the compensation amount to cancel a disturbance with respect to the assist torque as a frequency of the disturbance affecting a steering system increases; wherein
    the compensating for the assist torque includes increasing gain as the frequency becomes higher in a differential compensator which calculates an operation amount from the steering torque and outputs a differential compensation signal, and further increasing the gain for a specific desired frequency by performing phase advance compensation on the differential compensation signal output from the differential compensator with a phase advance compensator to further increase the gain at the specific desired frequency and output a phase advance compensation signal.

11. The control method according to claim 10, the control method comprising:
    decreasing the assist torque as a vehicle speed increases.

12. The control method according to claim 10, wherein the phase advance compensation advances a phase of a compensation signal to compensate for the assist torque.

* * * * *